July 11, 1933.　　H. T. WOOLSON　　1,918,166

TRANSMISSION

Filed April 13, 1927

INVENTOR
HARRY T. WOOLSON.
BY *Irving Harness*
ATTORNEY.

Patented July 11, 1933

1,918,166

UNITED STATES PATENT OFFICE

HARRY T. WOOLSON, OF DETROIT, MICHIGAN, ASSIGNOR TO CHRYSLER CORPORATION, OF HIGHLAND PARK, MICHIGAN, A CORPORATION OF DELAWARE

TRANSMISSION

Application filed April 13, 1927. Serial No. 183,525.

This invention relates to a change speed mechanism and more particularly to a four speed transmission for use on a motor vehicle.

An important object of the invention is to simplify and cheapen the cost of construction and at the same time to obtain an efficient, quiet and easily operable device.

Heretofore one end of the driven shaft has been mounted in the end of the driving shaft with its bearing between the inner end of the driving shaft and the bearing for the driving shaft. By such a construction the adjacent ends of the two shafts are permitted to wobble, particularly when the bearings become worn, and misalignment results. It is therefore another object of the invention to eliminate any misalignment of the driven shaft by mounting it in bearings, one of which is supported in the gear casing and the other in a vertical plane with the bearing for the driving shaft.

In the use of transmission gears, especially gears of the internal tooth type, difficulty has been experienced in supplying lubricant thereto when only the splash of the lubricant is depended upon. To overcome this difficulty and as another object of the invention, an improved arrangement of parts has been provided whereby such gears may be properly lubricated at all times.

Other objects and advantages will more fully appear from the following description taken in connection with the accompanying drawing in which.

Figure 1:
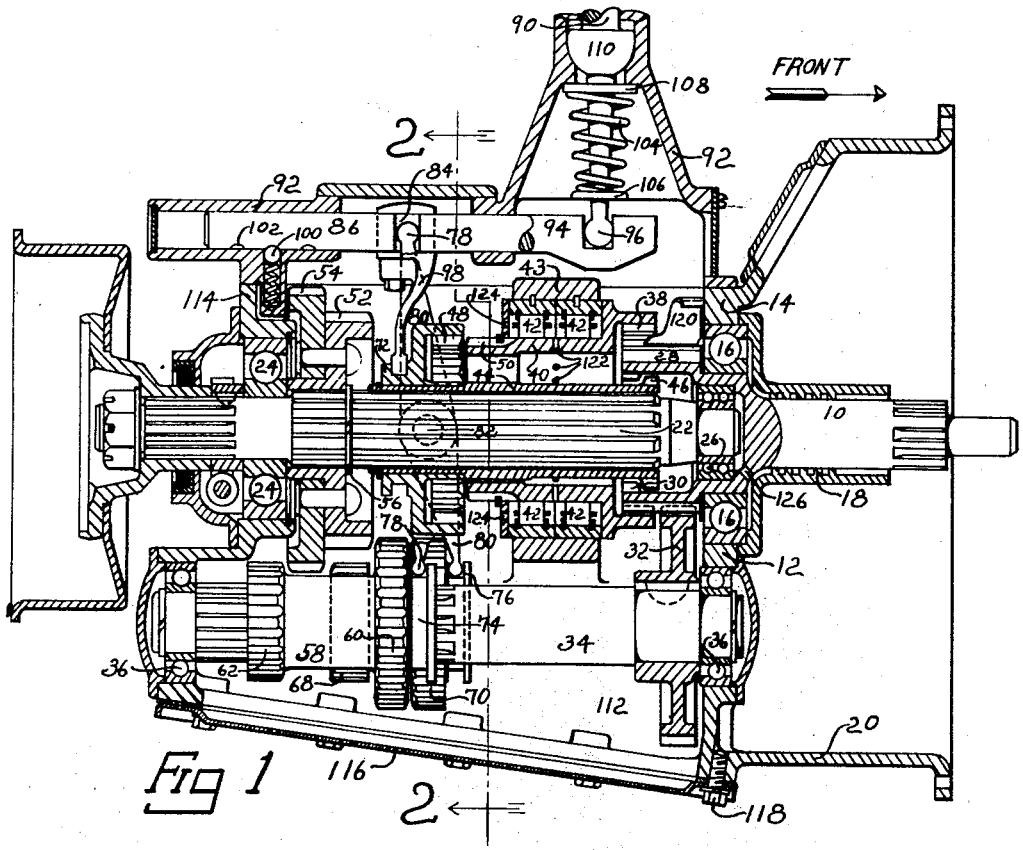
Fig. 1 is a sectional view of the transmission.
Figure 2:
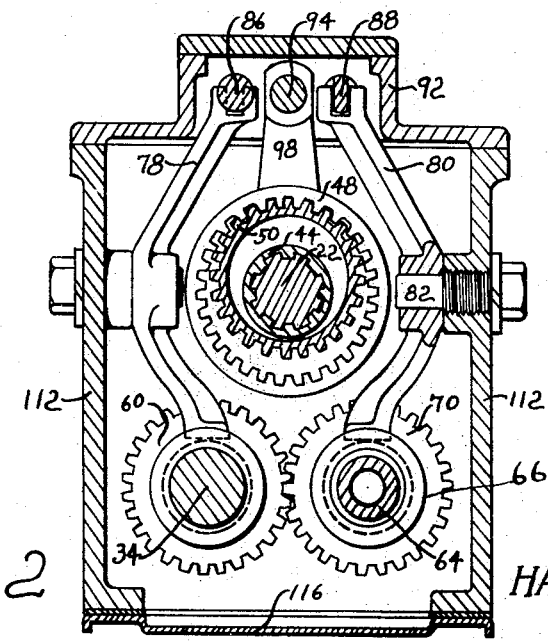
Fig. 2 is a sectional view on line 2—2 of Fig. 1.

Referring to the drawing, a driving shaft 10 has been mounted in the forward end wall 12 of a casing 14. A bearing 16 in the wall 12 supports the shaft 10 and a sleeve 18 secured to the wall 12 forms a lubricant seal for the bearing and the outer end of the sleeve further supports the outer end of the shaft 10. The casing 14 is extended as at 20 to form a clutch housing. The shaft 10 has been considered as the driving shaft with respect to the transmission but is adapted to be driven by a suitable source of power not shown.

A driven shaft 22, in axial alignment with the shaft 10, is mounted in bearings 24 and 26, one of which 24 is supported in the opposite end wall of the casing 14 and the other 26 in a vertical plane with the bearing 16 for the driving shaft. To permit such an arrangement of parts, the inner end of the driving shaft 10 is tubular with the bearing 16 on the outer periphery and the bearing 26 on the inner periphery. This permits a rigid construction equivalent to a driven gear supported in the end walls at its opposite ends yet the driving and driven shafts are axially aligned one supported within the other. The tubular inner end of the shaft 10 is provided with an external gear 28 and an internal toothed clutch member 30. The gear 28 is in constant mesh with a gear 32, keyed to a counter shaft 34 supported in bearings 36 in the end walls of the casing 14. An internal gear 38 is in constant mesh with the gear 28 and is formed on the inner periphery of a sleeve member 40 journaled in the bearings 42 carried by a boss 43 on the casing. The sleeve member 40 is supported independent of the shaft 22 and eccentric thereto.

Slidably mounted on the driven shaft is a splined sleeve member 44 having at its opposite ends an external toothed clutch member 46 and an internal gear 48. When the sleeve is slid to the left the clutch member 46 engages the clutch member 30 and when slid to the right the gear 48 meshes with an external gear 50 on the opposite end of the sleeve 40. Gears 52 and 54 are keyed to the shaft 22 for rotation therewith and are positioned axially by a ring 56 and the inner race of the bearing 24.

Slidably mounted on the counter shaft 34 is a splined sleeve member 58 having external gears 60 and 62 at its opposite ends, the gear 62 to mesh with the gear 54 when slid to the right and the other gear 60 to mesh with the gear 52 when slid to the left. Parallel to the shaft 34 and in a horizontal plane therewith, is another shaft 64 having a splined sleeve member 66. This sleeve member is slidably mounted on the shaft 64 and its opposite ends are provided with external gears 68 and 70. The gear 68 is adapted to mesh with the gear 60. Suitable collars 72, 74 and 76 have been provided on the sleeves 44, 58 and 66 and a pair of arms 78 and 80, pivoted to the casing 14 as at 82, have their lower ends engaging the collars 74 and 76 respectively for shifting the sleeves for meshing the gears. The upper ends of the arms 78 and 80 engage slots 84 in slidable cross rods 86 and 88 and a shifting lever 90 pivoted in the cover 92 of the casing 14 is adapted to selectively engage either the rod 86 or the rod 88 for sliding the rods longitudinally of the transmission to oscillate the arms 78 or 80 which in turn change the position of the sleeves 58 and 66. A center rod 94 is provided with a groove 96 adapted to receive the lower end of the lever 90. Two similar grooves are formed in the rods 86 and 80 and it will be understood that when these three grooves are aligned, as in neutral position, the lever 90 may be moved to engage either one of the three rods. Secured to the rod 94 is an arm 98 the lower end of which engages the collar 72 for shifting the sleeve 44 and its gears in one of two directions from its neutral position. The sleeve 58 is shiftable in one of two directions from its neutral position while the sleeve 66 is shiftable in only one direction from its neutral position.

The parts are shown in neutral position and in describing the shifting of the mechanism thru its entire speed range, the first speed is obtained by tilting the lever 90 to the left, engaging the lower end of the lever with the rod 86, and moving it forwardly. Such movement causes the rod 86 to be moved rearwardly oscillating the arm 78 and thereby sliding the sleeve 58 forward meshing the gears 62 and 54. For this speed the drive is transmitted from the driving shaft 10 and gear 28 thru gear 32, shaft 34 and gear 62 to gear 54 which drives the shaft 22 at a reduced rate of speed. In shifting from first speed to second speed the lever 90 is moved rearwardly past its neutral position. This movement acting thru the rod 86 and lever 78 moves the sleeve 58 for engagement of the gears 60 and 52. This drive is taken from the driving shaft 10 and gear 28 thru gear 32, shaft 34 and gear 60 to gear 52 which drives the shaft 22. The third speed is obtained by moving the lever 90 forwardly to its neutral position, tilting it to the right in a vertical position engaging the lower end of the lever with the rod 94 and moving it rearwardly. This movement causes the sleeve 44 to be slid forwardly engaging the internal gear 48 with the external gear 50, the drive being from the drive shaft 10 and gear 28 thru internal gear 38, sleeve 40 and gear 50 thru the gear 48 which drives the shaft 22. This speed as well as the second is lower than the speed of the driving shaft 10 but each of the three speeds thus described are relatively increased. The fourth speed or direct drive is obtained by moving the lever 90 rearwardly past its neutral position sliding the sleeve 44 rearwardly engaging the clutch members 46 and 30, the drive being from the driving shaft 10 and members 30 and 46 to the sleeve 44 which drives the shaft 22 at the same speed of the driving shaft 10. For the reverse speed the lever 90 is returned to its neutral position tilted to the right engaging the lower end of the lever with the rod and moving its rearwardly. This movement acting thru rod 88 and arm 80 causes the sleeve to slide rearwardly engaging gears 68 and 54 and gears 60 and 70. The drive is taken from the driving shaft 10 and gear 28 thru gear 32, shaft 34 and gear 60 to gear 70, gear 68 and gear 54 which drives the shaft 22 in a reverse direction and at a reduced rate of speed.

The lever 90 and rods 86, 88 and 94 are mounted in the cover 92 removable as a unit therewith. A spring pressed ball 100 in the cover is adapted to engage one of several notches 102 in the rods. One spring pressed ball is shown but in alignment therewith are others which engage the other two rods 94 and 88. The rods are normally held in neutral position or any of the shifted positions. Any one of the rods may be shifted against the pressure of the spring pressed ball to move its respective rod lengthwise in either direction to a position determined by the engagement of the ball 100 in one of the notches 102.

The lever 90 is held in the cover 92 by a spring 104, seated on a flange 106 secured to the lower end of the lever, and pressing against a collar 108 engaging the cover and loosely fitting the lever 90. By this arrangement the spring 104 resiliently retains the ball portion 110 in its spherical seat formed in the cover.

The casing 14 consists of the clutch housing 20, side walls 112 and end walls 114 and 12 thus providing a casing inexpensive to manufacture and one in which the parts are readily assembled. The upper portion of the casing is closed by the cover 92 and the lower portion is closed by a stamped cover 116 secured to the casing by bolts 118.

Referring to the lubrication of the various moving parts of the assembled transmission I have provided a baffle 120 secured to the casing above the gears 32 and 28. This baffle is arranged to catch the lubricant centrifugally thrown around the casing and to direct it into the sleeve member 40. Part of the lubricant in this constantly revolving sleeve flows laterally lubricating the gears 48, 50, and 38, and clutch members 30 and 46. Another portion of the lubricant is centrifugally thrown thru a plurality of openings 122 in the sleeve thereby lubricating the bearings 42. A passage 124 in the bearing retainer conducts the lubricant from the bearings to the upper surface of the gear 50. This feature is particularly desirable when the gear 48 is in mesh with the gear 50. Otherwise the internal gear 48 would prevent the splashed or centrifugally thrown lubricant from lubricating these meshed gears. The gear 38 is in constant mesh with the gear 28 and as it is of the internal type it is important to lubricate it internally. The bearing 26 is lubricated by the lubricant in the tubular end of the shaft 10, directed thereto by the baffle 120. The bearing 16 is lubricated by the lubricant passing thru the bearing 26 and centrifugally thrown thru openings 126 in the shaft 10. It will be understood that the other parts of the mechanism may be lubricated by the usual splash system.

It will be obvious that various changes may be made in the arrangement, combination and construction of the various parts of my improved device without departing from the spirit of my invention, and it is my intention to cover by my claims such changes as may be reasonably included within the scope thereof.

What I claim is:

1. In a transmission mechanism of the class described comprising, a casing, an external driving gear in said casing, a sleeve mounted in said casing having an internal gear at one end thereof in constant mesh with said driving gear and an external gear at the opposite end thereof, a slidable internal gear adapted to be meshed with said last named external gear, a bearing between said sleeve and said casing, means for directing lubricant within said sleeve, and means for conducting lubricant thru said sleeve to said bearing.

2. In a transmission mechanism of the class described comprising, a casing, an external driving gear in said casing, a sleeve mounted in said casing having an internal gear at one end thereof in constant mesh with said driving gear and an external gear at the opposite end thereof, a slidable internal gear adapted to be meshed with said last named external gear, a bearing between said sleeve and said casing, means for directing lubricant within said sleeve, and means for conducting lubricant thru said sleeve to said bearing and thence into said slidable internal gear.

HARRY T. WOOLSON.